US012783397B2

(12) United States Patent
Cheng et al.

(10) Patent No.: US 12,783,397 B2
(45) Date of Patent: Nov. 3, 2026

(54) SMARTPHONE INSPECTION DEVICE

(71) Applicant: iMT Co., Ltd., Kaohsiung (TW)

(72) Inventors: Yu-Che Cheng, Kaohsiung (TW); Bo-Zih Chien, Kaohsiung (TW)

(73) Assignee: iMT Co., Ltd., Kaohsiung (TW)

( * ) Notice: Subject to any disclaimer, the term of this patent is extended or adjusted under 35 U.S.C. 154(b) by 28 days.

(21) Appl. No.: 18/966,522

(22) Filed: Dec. 3, 2024

(65) Prior Publication Data

US 2025/0342111 A1 Nov. 6, 2025

(30) Foreign Application Priority Data

May 3, 2024 (TW) ................................ 113116542

(51) Int. Cl.

*G06F 11/3698* (2025.01)
*G01N 21/88* (2006.01)
*G06F 11/30* (2006.01)
*G06F 11/32* (2006.01)

(52) U.S. Cl.

CPC ..... *G06F 11/3698* (2025.01); *G01N 21/8806* (2013.01); *G01N 21/8851* (2013.01); *G06F 11/3013* (2013.01); *G06F 11/321* (2013.01); *G06F 11/328* (2013.01)

(58) Field of Classification Search

CPC ...................................................... G06N 20/00
See application file for complete search history.

(56) References Cited

U.S. PATENT DOCUMENTS

2017/0206532 A1* 7/2017 Choi ..................... G06Q 30/02
2023/0259910 A1* 8/2023 Forutanpour ....... H04M 1/0287
705/308

* cited by examiner

*Primary Examiner* — Henry Tsai
*Assistant Examiner* — Juanito C Borromeo
(74) *Attorney, Agent, or Firm* — Troutman Pepper Locke LLP; Tim Tingkang Xia, Esq.

(57) ABSTRACT

A smartphone inspection device comprises: a main body extending along a height direction, wherein the main body comprises: a first inclined surface formed at an end of the main body; and an inspection space formed inside the main body and communicated with the first inclined surface, wherein the inspection space comprises: a second inclined surface formed adjacent to the first inclined surface; and a third inclined surface formed corresponding to the first inclined surface and formed adjacent to the second inclined surface; a lid deposited on the first inclined surface; a push bar movably deposited inside the main body and deposited corresponding to the second inclined surface; and a camera assembly deposited in the inspection space and deposited corresponding to the lid.

8 Claims, 8 Drawing Sheets

SMARTPHONE INSPECTION DEVICE

CROSS REFERENCE

This non-provisional application claims priority of Taiwan Invention Patent Application No. 113116542, filed on May 3, 2024, the contents thereof are incorporated by reference herein.

FIELD OF THE INVENTION

The present invention is related to an inspection device, and more particularly to a device for smartphone inspection.

BACKGROUND OF THE INVENTION

Nowadays, in the process of smartphone inspection, there is usually a need to take the smartphone to a physical store and to conduct the defect inspection with a staff on site. However, this process is cumbersome and takes a lot of time. Such manual inspection inevitably affects the inspection result due to the staff's subjective valuation. That is, when different staffs perform inspection of the same smartphone, there may be different inspection results happening so that the owner of the smartphone is confused about these results. As such, there is a need to provide an inspection device without manual determination, which can establish clear standards for smartphone inspection and then quickly provide the inspection results.

SUMMARY OF THE INVENTION

An objective of the present invention is to provide a smartphone inspection device, which can inspect a smartphone with clear inspection standards and ensure high inspection efficiency and accuracy.

For the foregoing mentioned objective, the present invention provides a smartphone inspection device, the device comprising: a main body extending along a height direction, wherein the main body comprises: a first inclined surface formed at an end of the main body; and an inspection space formed inside the main body and communicated with the first inclined surface, wherein the inspection space comprises: a second inclined surface formed adjacent to the first inclined surface for optionally being in contact with a first surface of a smartphone; and a third inclined surface formed corresponding to the first inclined surface and formed adjacent to the second inclined surface for optionally being in contact with a second surface of the smartphone; a lid deposited on the first inclined surface for optionally shielding the inspection space; a push bar movably deposited inside the main body and deposited corresponding to the second inclined surface for optionally pushing the smartphone from a first position to a second position, wherein when the smartphone is at the first position, the first surface of the smartphone is in contact with the second inclined surface; when the smartphone is at the second position, the second surface of the smartphone is in contact with the third inclined surface; and a camera assembly deposited in the inspection space and deposited corresponding to the lid for optionally taking an image of the first surface of the smartphone and another image of the second surface of the smartphone upon the lid shielding the inspection space.

In the present invention, the images of the front surface and the back surface of the smartphone can be captured so as to fully provide appearance defect inspection of the smartphone. Based on that the lid is deposited corresponding to the camera assembly, the camera assembly is started to take an image of the smartphone, when the lid switches to a closed configuration to make the inspection space stay in a closed position. This can ensure that the inspection process for the smartphone can't be disturbed to avoid affecting inspection accuracy. Additionally, the camera assembly may comprise: a first camera and a second camera for facing the second surface and the first surface of the smartphone respectively. This can maintain the inspection accuracy so that the defect size and the defect position shown in the image are consistent with the actual situation of the smartphone. That is, it can't happen that the inspection result is distorted due to irregular offset resulted from angle deviation. Generally, the present invention can quickly determine the defect on the smartphone with fixed inspection standards to truly evaluate the value of the smartphone. As such, the owner of the smartphone can clearly understand the whole situation of the smartphone and recycles the smartphone to gain the appropriate remuneration.

DETAILED DESCRIPTION OF THE INVENTION

The detailed description and preferred embodiments of the invention will be set forth in the following content, and provided for people skilled in the art to understand the characteristics of the invention.

Figure 1:
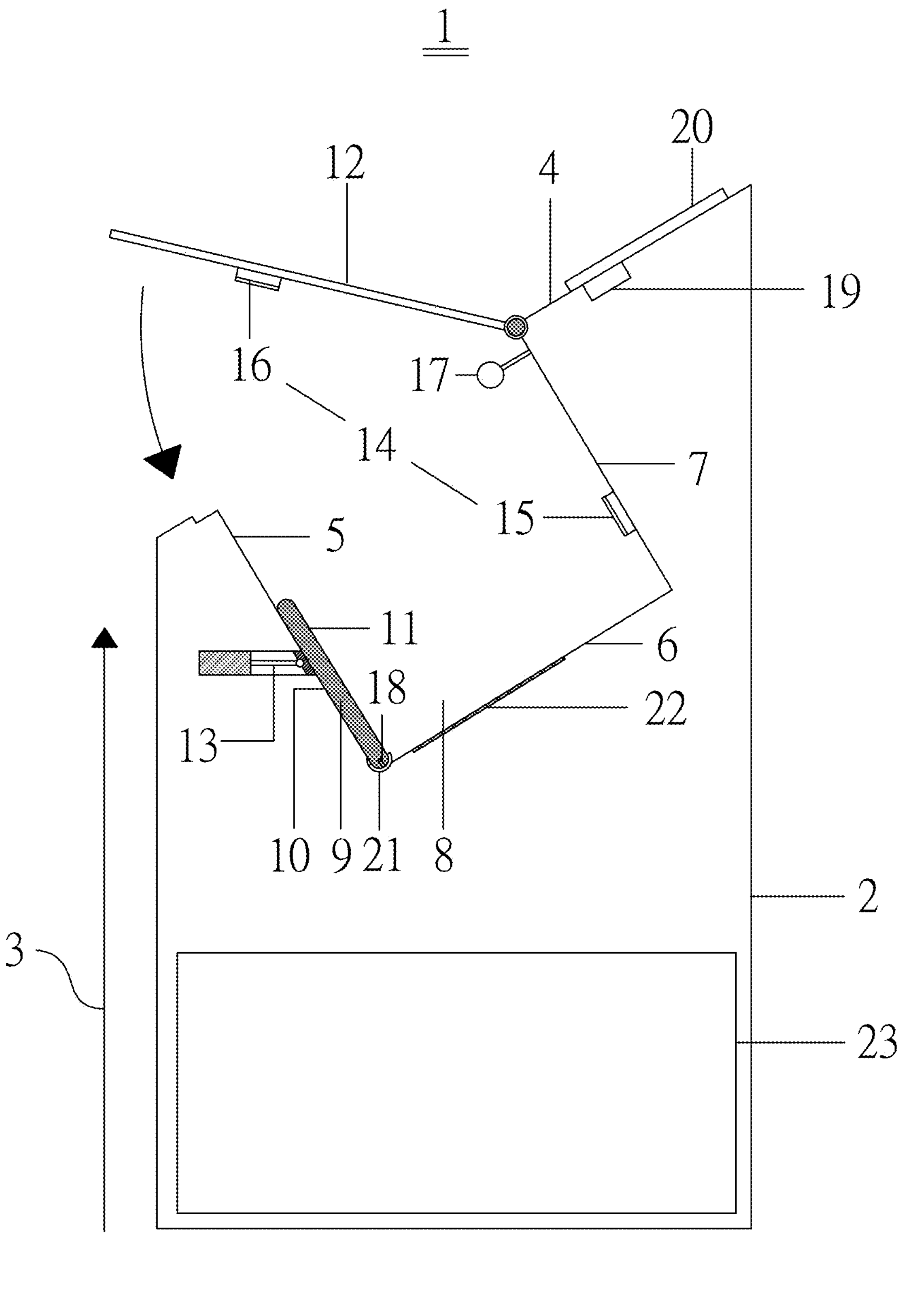
FIG. 1 is a schematic diagram illustrating the structural features of the smartphone inspection device and its status where the smartphone is placed on the second inclined surface.

As shown in FIG. 1, the smartphone inspection device (1) in accordance with the present invention comprises: a main body (2) extending along a height direction (3), wherein the main body (2) comprises: a first inclined surface (4) formed at an end of the main body (2); and an inspection space (8) formed inside the main body (2) and communicated with the first inclined surface (4), wherein the inspection space (8) comprises: a second inclined surface (5) formed adjacent to the first inclined surface (4) for optionally being in contact with a first surface (10) of a smartphone (9); and a third inclined surface (6) formed corresponding to the first inclined surface (4) and formed adjacent to the second inclined surface (5) for optionally being in contact with a second surface (11) of the smartphone (9); a lid (12) deposited on the first inclined surface (4) for optionally shielding the inspection space (8); a push bar (13) movably deposited inside the main body (2) and deposited corresponding to the second inclined surface (5) for optionally pushing the smartphone (9) from a first position to a second position, wherein when the smartphone (9) is at the first position, the first surface (10) of the smartphone (9) is in contact with the second inclined surface (5); when the smartphone (9) is at the second position, the second surface (11) of the smartphone (9) is in contact with the third inclined surface (6); and a camera assembly (14) deposited in the inspection space (8) and deposited corresponding to the lid (12) for optionally taking an image of the first surface (10) of the smartphone (9) and another image of the second surface (11) of the smartphone (9) upon the lid (12) shielding the inspection space (8). In an embodiment, in order to avoid image distortion or image offset, the camera assembly (14) is deposited corresponding to the second inclined surface (5) and the third inclined surface (6) so that when the smartphone (9) is placed at the first position, the camera assembly (14) faces the second surface (11) of the smartphone (9); when the smartphone (9) is placed at the second position, the camera assembly (14) faces the first surface (10) of the smartphone (9). In an embodiment, the first surface (10) is a front surface where a screen is disposed, and the second surface (11) is a back surface where the screen is not disposed; or the first surface (10) is a back surface where a screen is not disposed, and the second surface (11) is a front surface where the screen is disposed. In an embodiment, the lid (12) is deposited on the first inclined surface (4) with a hinge or a slide rail.

In order to capture the images of the first surface (10) and the second surface (11) of the smartphone (9), the inspection space (8) comprises: a fourth inclined surface (7) formed adjacent to the first inclined surface (4) and the third inclined surface (6) and formed corresponding to the second inclined surface (5); and the camera assembly (14) comprises: a first camera (15) deposited at a side of the fourth inclined surface (7) facing the inspection space (8) for optionally taking the image of the second surface (11) of the smartphone (9) upon the smartphone (9) placed on the second inclined surface (5); and a second camera (16) deposited on a side of the lid (12) facing the inspection space (8) for optionally taking the image of the first surface (10) of the smartphone (9) upon the smartphone (9) placed on the third inclined surface (6). In order to make the first camera (15) rightly face the second inclined surface (5) and to make the second camera (16) rightly face the third inclined surface (6), the first inclined surface (4) is formed parallel with the third inclined surface (6), and the second inclined surface (5) is formed parallel with the fourth inclined surface (7). In an embodiment, a central axis of the first camera (15) is vertical to the second inclined surface (5), and a central axis of the second camera (16) is vertical to the third inclined surface (6). In an embodiment, in order to inspect the non-obvious defect on the smartphone (9), a lighting device (17) is provided to be deposited in the inspection space (8) for optionally illuminating the smartphone (9).

Figure 2:
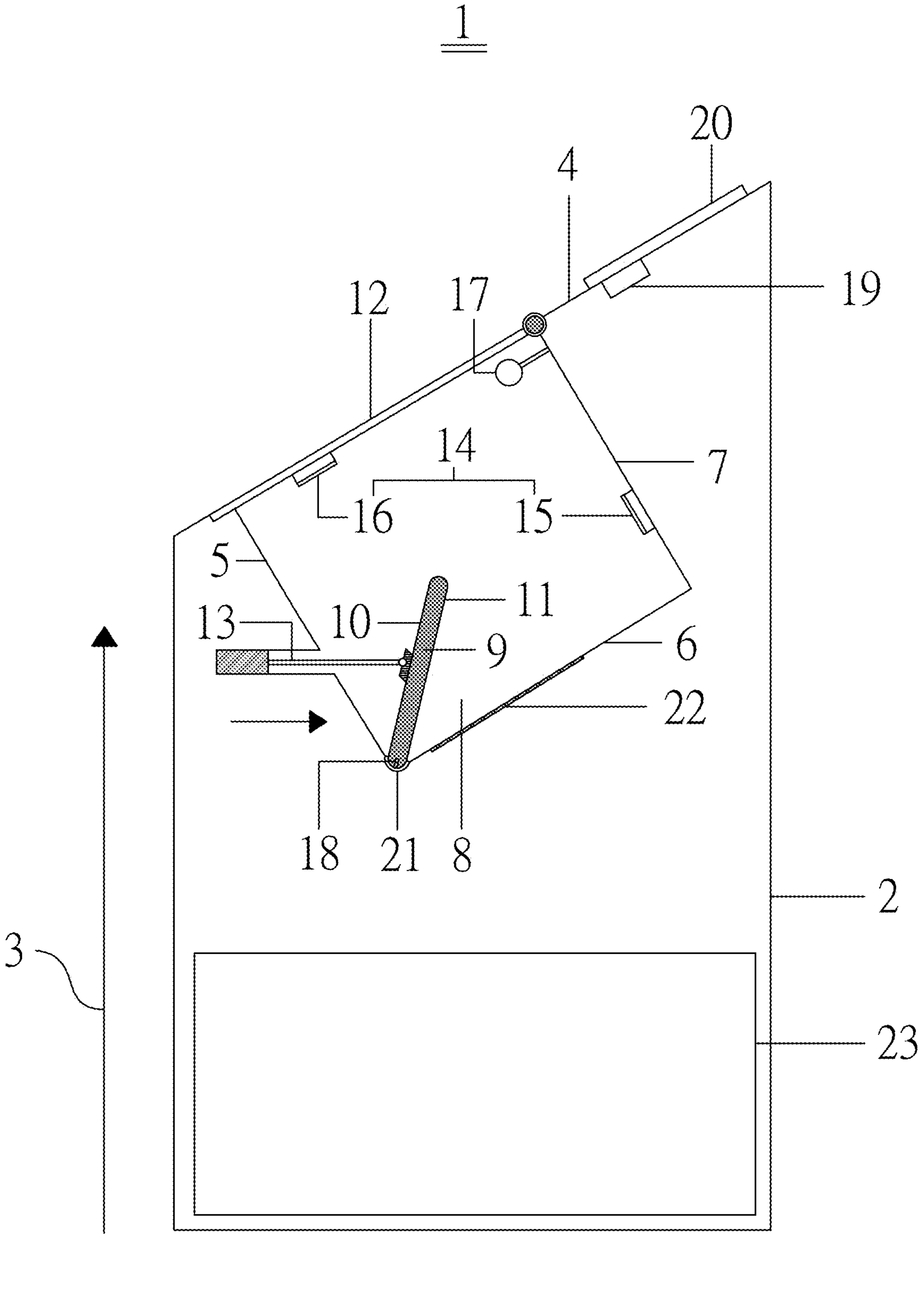
FIG. 2 is a schematic diagram illustrating the structural features of the smartphone inspection device and its status where the push bar pushes the smartphone.
Figure 3:
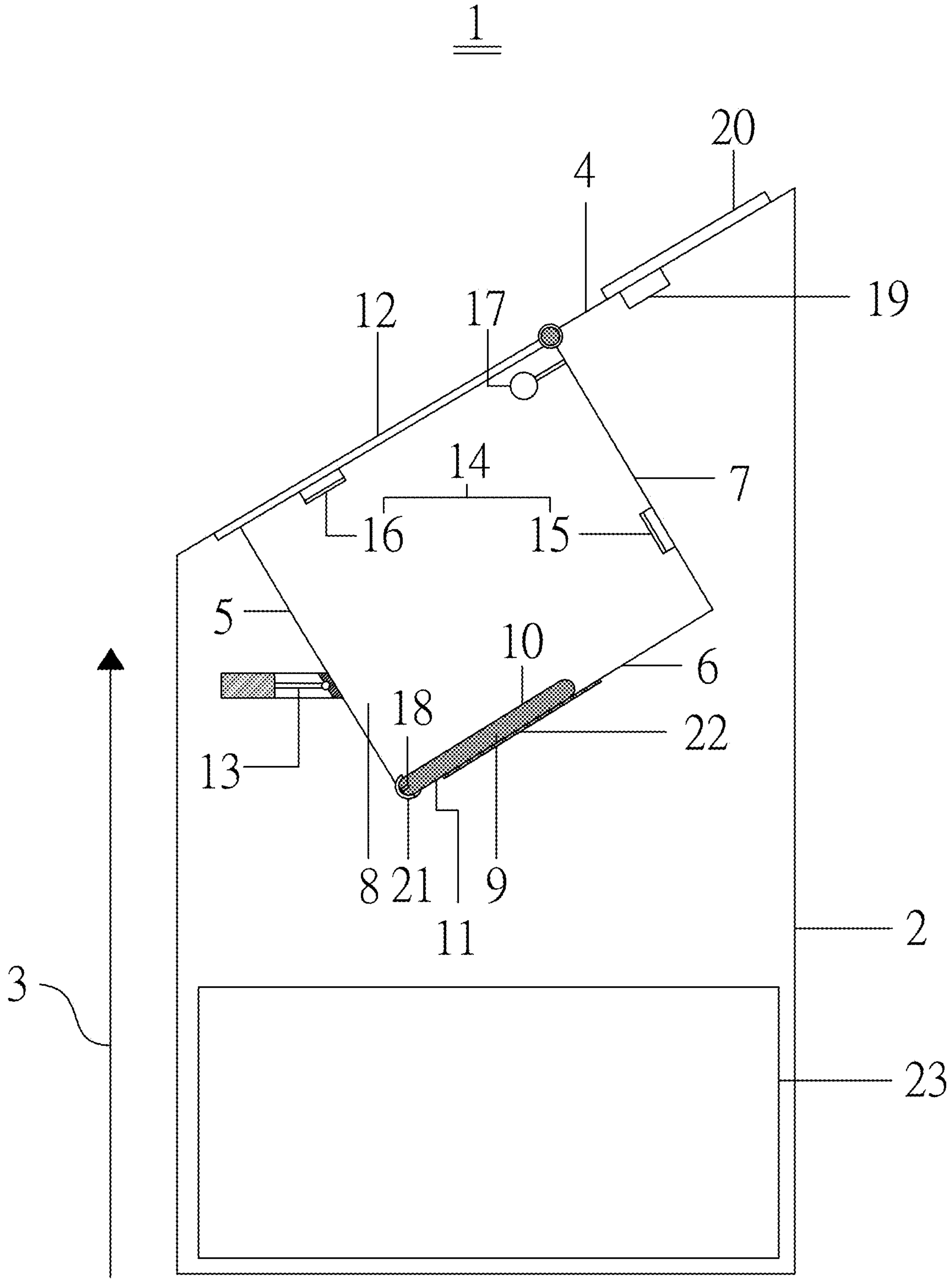
FIG. 3 is a schematic diagram illustrating the structural features of the smartphone inspection device and its status where the smartphone is placed on the third inclined surface.

The operation process of the smartphone inspection device (1) is illustrated below. As shown in FIG. 1, when the lid (12) switches to an opened configuration, the first surface (10) of the smartphone (9) is attached to the second inclined surface (5), and an end of the smartphone (9) is placed in an arc portion (21). After the lid (12) switches to a closed configuration, the inspection space (8) is in a closed position. At this moment, the lighting device (17) emits light to the second surface (11) of the smartphone (9) and the first camera (15) is started to take the image of the second surface (11) of the smartphone (9). As shown in FIG. 2, the push bar (13) is then driven to push the first surface (10) of the smartphone (9) so that the smartphone (9) is pivoted using the arc portion (21) as a rotating axis and then the second surface (11) of the smartphone (9) is in contact with the third inclined surface (6). As shown in FIG. 3, after the smartphone (9) pivoting ends, the lighting device (17) is driven to emit light to the first surface (10) of the smartphone (9) and the second camera (16) is started to take the image of the first surface (10) of the smartphone (9). As such, the appearance defect inspection for the smartphone (9) finishes.

In order to reduce the abrasion or breakage to the smartphone (9) upon the smartphone (9) pushed by the push bar (13), the arc portion (21) is provided to be rotatably deposited at a boundary between the second inclined surface (5) and the third inclined surface (6) so that an end of the smartphone (9) can be optionally placed in the arc portion (21). When the push bar (13) pushes the smartphone (9), the smartphone (9) can be rotated to push the arc portion (21) so that the arc portion (21) is rotated at the boundary between the second inclined surface (5) and the third inclined surface (6). By such a way, the smartphone (9) is rotated relative to the main body (2) so that the second surface (11) of the smartphone (9) is in contact with the third inclined surface (6). In an embodiment, in order to avoid the abrasion or breakage to the end of the smartphone (9), the arc portion (21) is made of a flexible material and has a smooth surface. In an embodiment, in order to avoid damaging the smartphone (9) due to large contact force when the smartphone (9) is in contact with the second inclined surface (5) or with the third inclined surface (6), a cushion pad (22) is provided to be deposited on a side of the second inclined surface (5) facing the inspection space (8) or to be deposited on a side of the third inclined surface (6) facing the inspection space (8).

In order to evaluate the recycle price of the smartphone (9) so that the owner of the smartphone (9) can determine whether to recycle the smartphone (9) with the same price by himself/herself, a modem connector (18) is provided to be deposited on the arc portion (21) for optionally being connected to the smartphone (9) and for optionally driving the smartphone (9) to execute at least one application and to record a body data of the smartphone (9) and a body load of the smartphone (9) upon the application executed, wherein the body data comprises: a product model of the smartphone (9), a brand of the smartphone (9), a manufactured date of the smartphone (9), or a warranty date of the smartphone (9), and the body load comprises: a power consumption of the smartphone (9), a body temperature of the smartphone (9), a processing efficiency of the smartphone (9), a speaker volume of the smartphone (9), a speaker noise of the smartphone (9), or a button response of the smartphone (9). A processor (19) is provided to be deposited inside the main body (2) and to be connected to the modem connector (18) and the camera assembly (14) for optionally: receiving the body data to convert into a depreciation factor; receiving the body load to be compared with a standard value and then to obtain a first efficacy index based on difference according to the comparison; receiving the images to mark a defect portion of the smartphone (9) on the images and then to obtain a second efficacy index based on evaluating an damage extent of the marked defect portion on the images; performing a weighted calculation on the depreciation factor, the first efficacy index, and the second efficacy index to obtain an appraisal index; and multiplying the appraisal index and an original purchase price of the smartphone (9) to obtain a recycle price of the smartphone (9). In an embodiment, in order to visualize the inspection results of the smartphone (9), a display panel (20) is provided to be deposited on the first inclined surface (4) for optionally showing the depreciation factor, the first efficacy index, the second efficacy index, and the recycle price. In an embodiment, the depreciation factor is a value reduction ratio of the smartphone (9) caused by the product model, the brand, the manufactured date, or the warranty date of the smartphone (9), the first efficacy index is made on the body performance of the smartphone (9), and the second efficacy index is made on an appearance damage extent of the smartphone (9). That is, the final obtained depreciation index, the appraisal index, is obtained based on all the above factors affecting the value of the smartphone (9).

Figure 4:
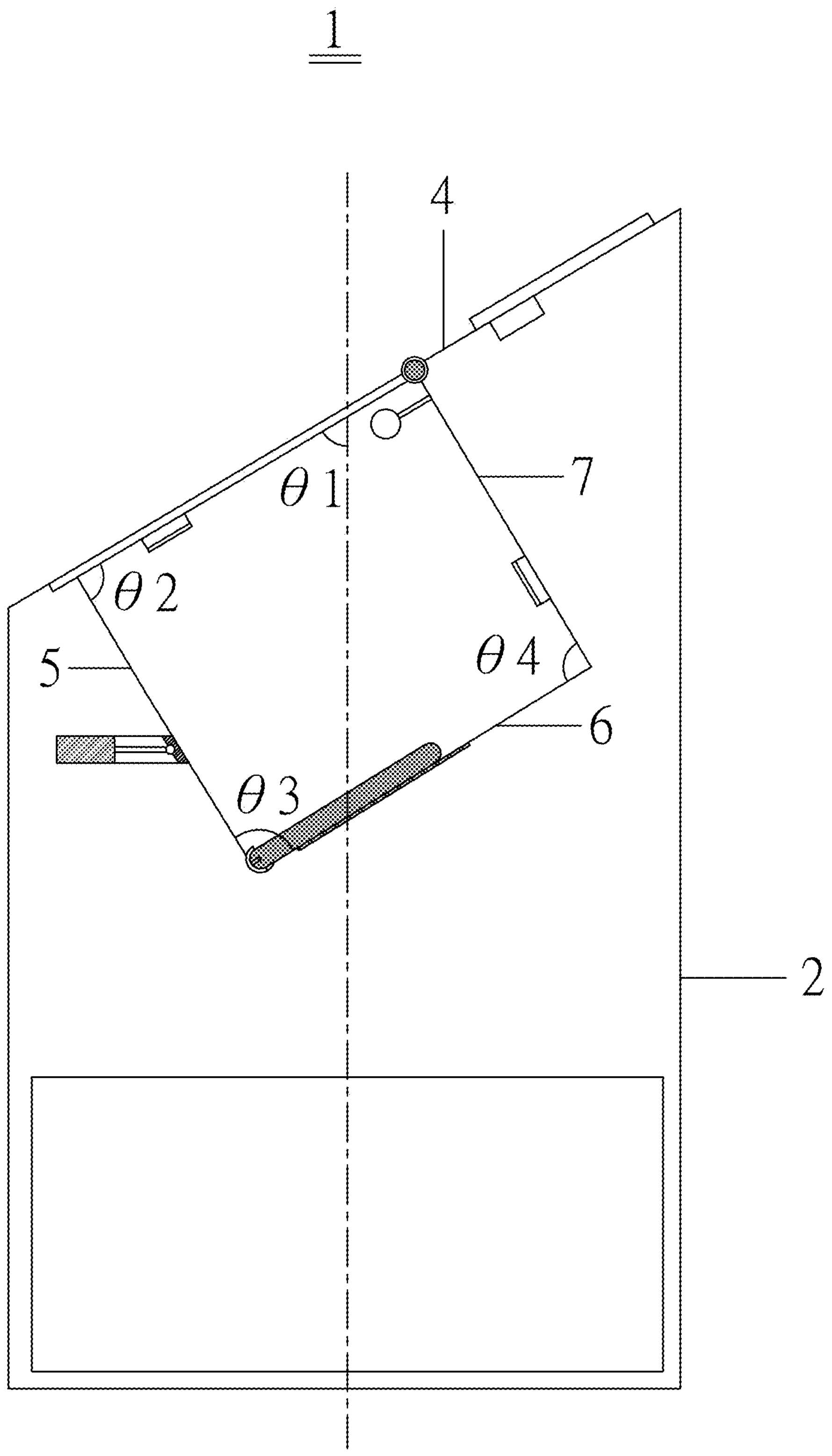
FIG. 4 is a schematic diagram illustrating the relations of the included angles θ1 to θ4.

In order to conveniently place the smartphone (9) into the inspection space (8), as shown FIG. 4, an included angle θ1 is formed between the first inclined surface (4) and a central axis of the main body (2), which is from 30° to 60°; an included angle θ2 is formed between the first inclined surface (4) and the second inclined surface (5), which is from 80° to 100°; an included angle θ3 is formed between the second inclined surface (5) and the third inclined surface (6), which is from 80° to 100°; an included angle θ4 is formed between the third inclined surface (6) and the fourth inclined surface (7), which is from 80° to 100°. In an embodiment, the included angle θ1 is but not limited to 45°, the included angle θ2 but not limited to is 90°, the included angle θ3 is but not limited to 90°, and the included angle θ4 is but not limited to 90°.

Figure 5A:
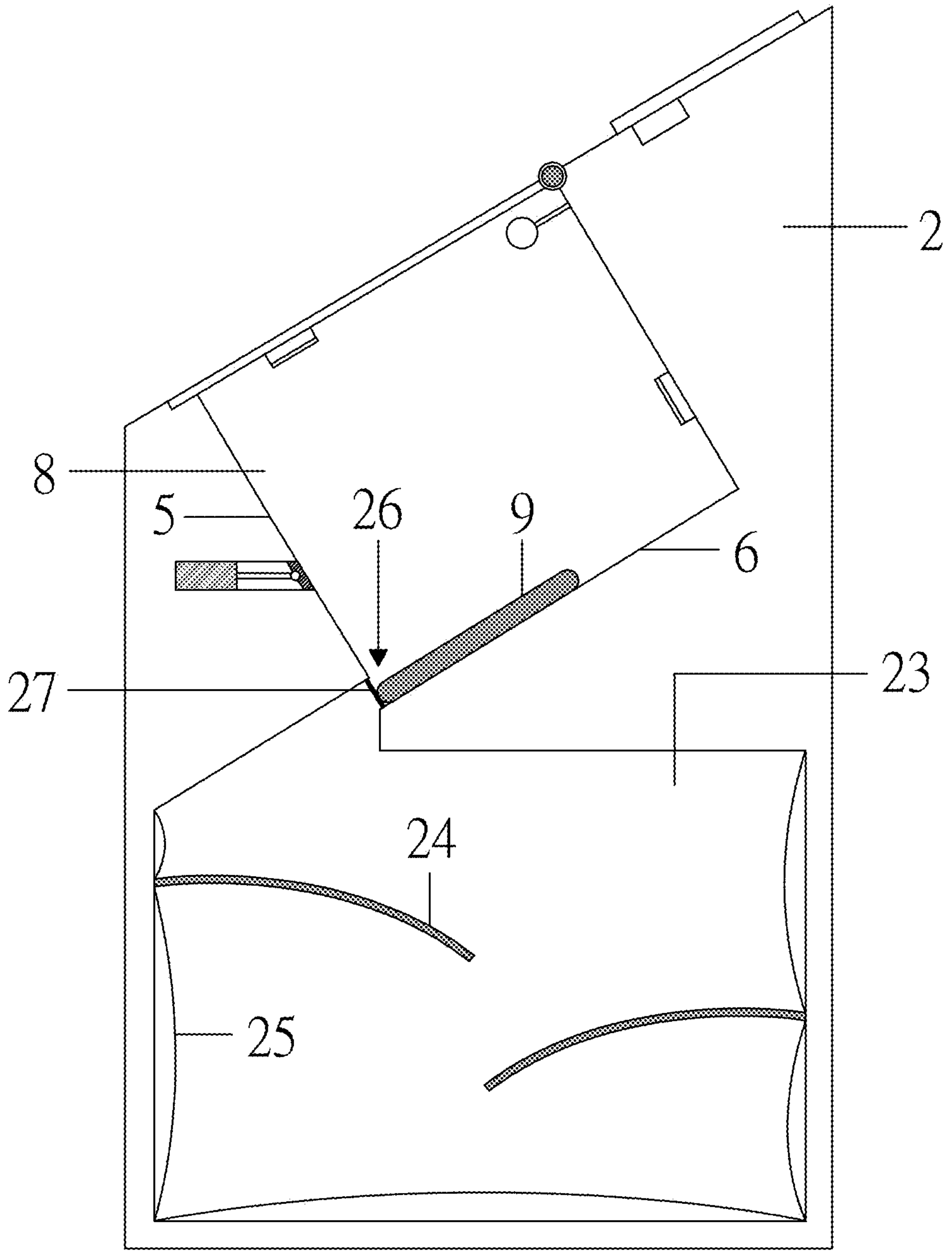
FIGS. 5A and 5B are schematic diagrams illustrating the collection and cushion structure for the smartphone.
Figure 5B:
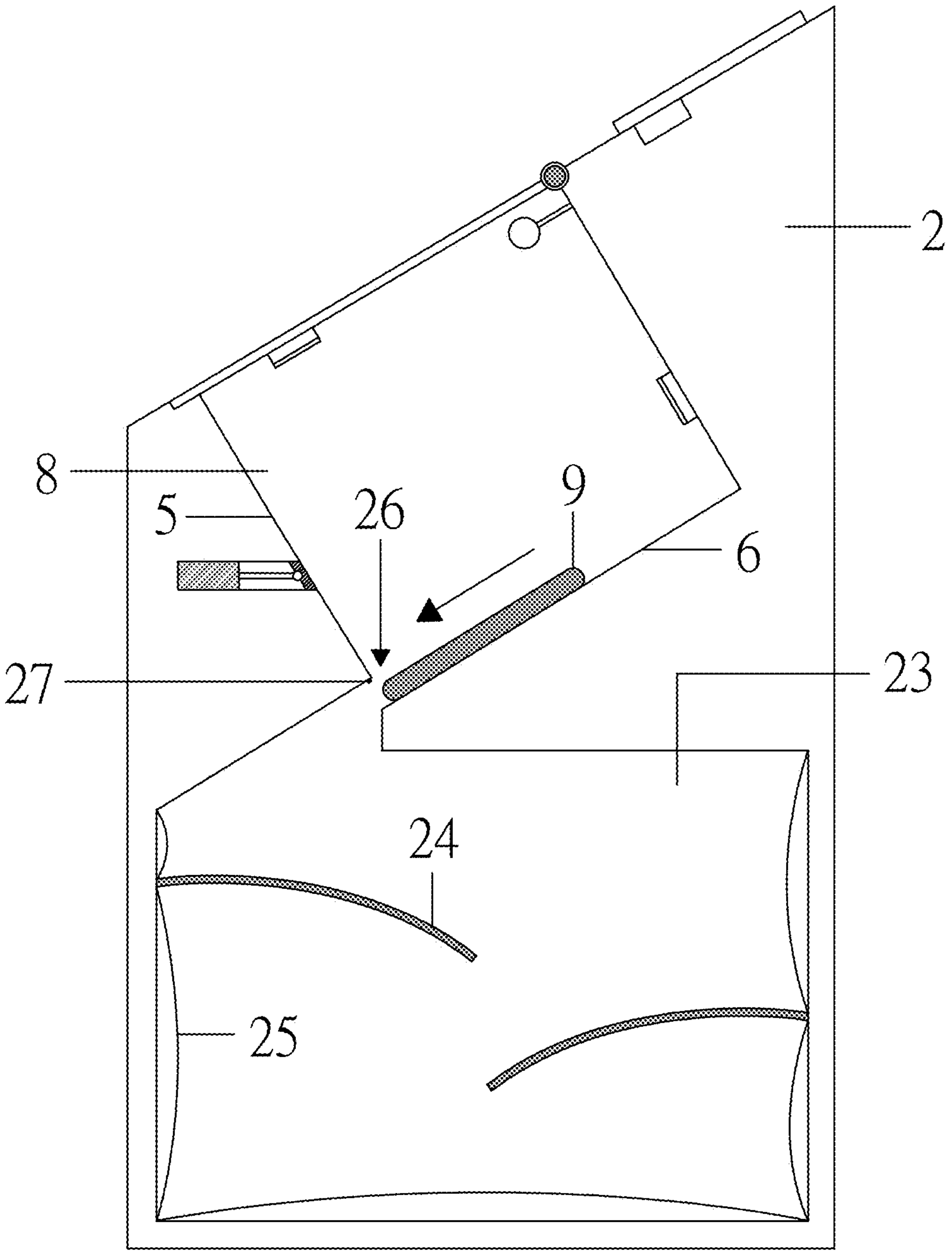
Figure 6A:
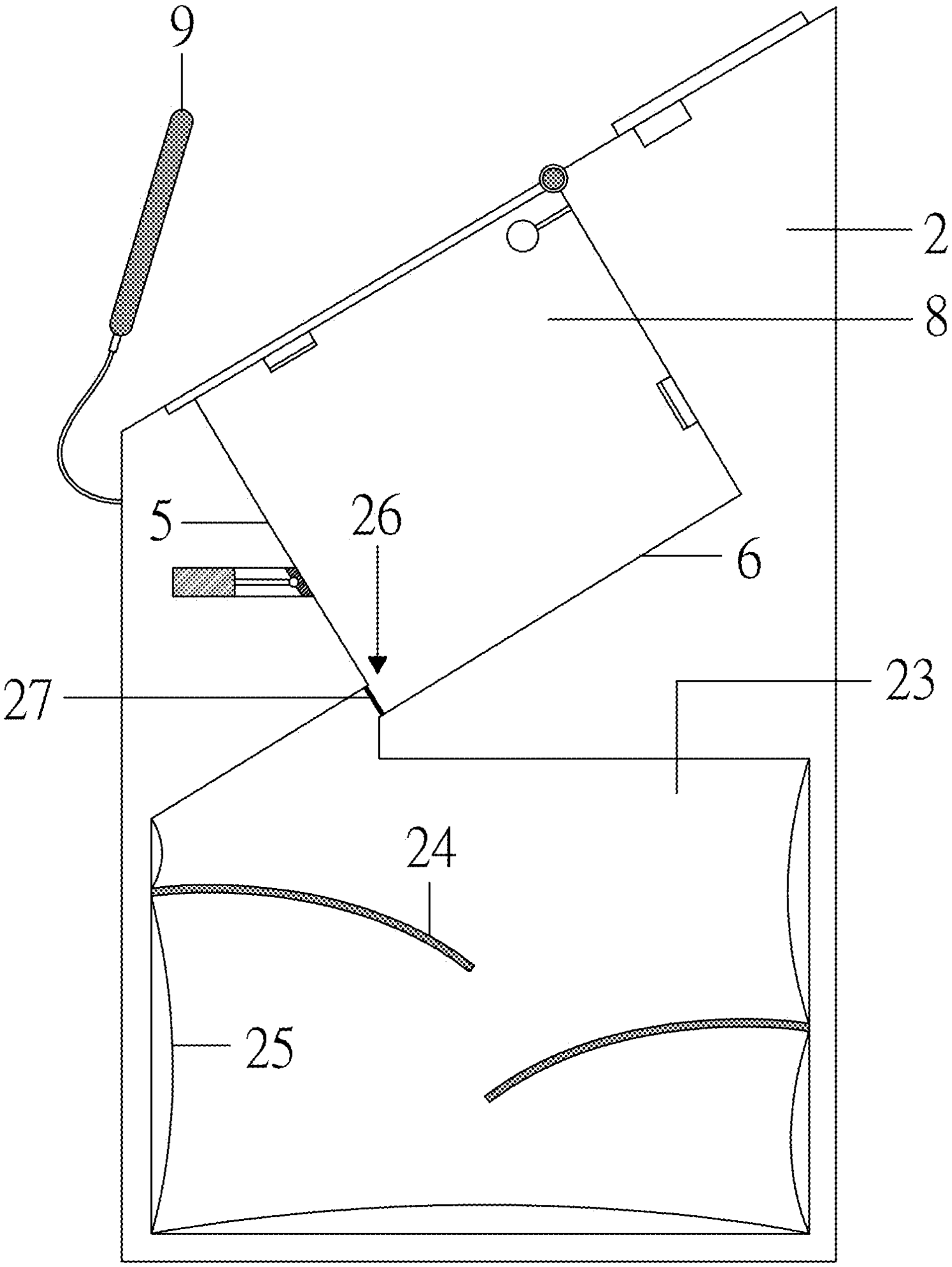
FIGS. 6A and 6B are schematic diagrams illustrating the inspection process for the smartphone.
Figure 6B:
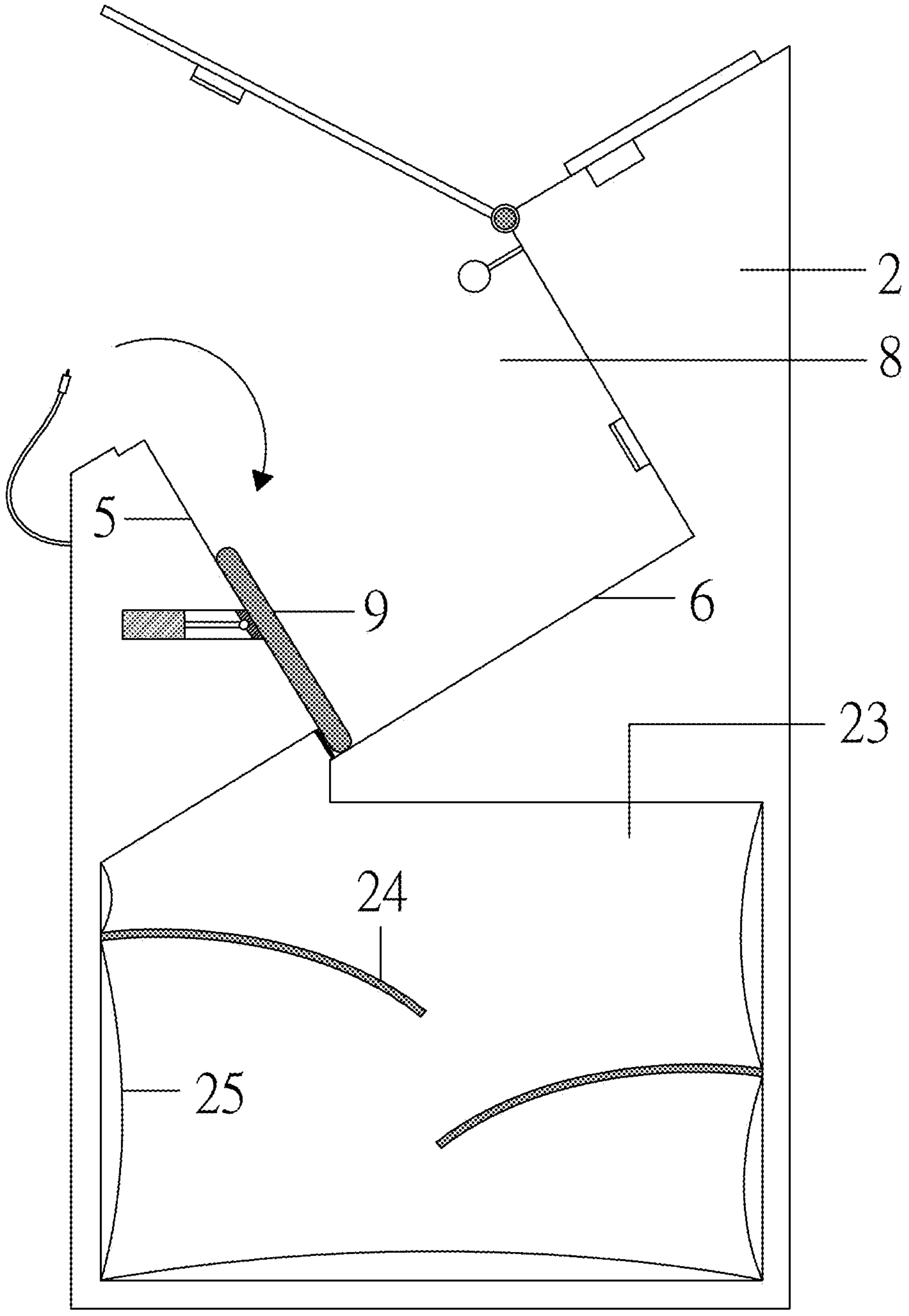

In order to avoid damaging the smartphone (9) upon the smartphone (9) collected, as shown in FIG. 5A, a storage space (23) is provided to be arranged with spacing between the inspection space (8) inside the main body (2) and to be communicated with the inspection space (8) for optionally receiving the smartphone (9). A cushion blocking plate (24) is provided to be deposited in the storage space (23) for optionally reducing the vertical percussion force on the smartphone (9) upon the smartphone (9) falling. A cushion patch (25) is provided to be deposited at a side of the storage space (23) facing the main body (2) for optionally reducing the horizontal percussion force on the smartphone (9) upon the smartphone (9) falling. In an embodiment, in order to take out the smartphone (9) from the storage space (23), a take-out opening is provided to be closable deposited on the main body (2) and to be communicated with the storage space (23) for the staff optionally taking out the smartphone (9) from the storage space (23) through the take-out opening. In an embodiment, in order to safely store the smartphone (9) upon the smartphone (9) recycled, a robotic arm is provided to be deposited in the storage space (23) for optionally clamping the smartphone (9) from the inspection space (8) to the storage space (23) and for neatly arranging the smartphone (9) in the storage space (23). In an embodiment, in order to automatically slide the smartphone (9) along the third inclined surface (6) into the storage space (23), as shown in FIGS. 5A and 5B, an aperture (26) is provided to be formed at the boundary between the second inclined surface (5) and the third inclined surface (6) and to be communicated with the storage space (23) and the inspection space (8). A door sheet (27) is provided to be movably deposited on the second inclined surface (5) for opening or closing the aperture (26) to allow sliding of the smartphone (9) from the inspection space (8) into the storage space (23). In an embodiment, in order to inspect the subtle performance of the hardware in the smartphone (9), another modem connector is provided to be outside the main body (2) for the staff connecting the modem connector with the smartphone (9) to inspect the smartphone (9) before placing the smartphone (9) in the inspection space (8) for appearance defect inspection.

As above, the images of the front surface and the back surface of the smartphone (9) can be captured so as to fully provide appearance defect inspection of the smartphone (9). Based on that the lid (12) is deposited corresponding to the camera assembly (4), the camera assembly (4) is started to take an image of the smartphone (9), when the lid (12) switches to a closed configuration to make the inspection space (8) stay in a closed position. This can ensure that the inspection process for the smartphone (9) can't be disturbed to avoid affecting inspection accuracy. Additionally, based on that the first camera (15) and the second camera (16) face the second surface (11) and the first surface (10) of the smartphone (9) respectively, the inspection accuracy can be maintained so that the defect size and the defect position shown in the image are consistent with the actual situation of the smartphone (9). That is, it can't happen that the inspection result is distorted due to irregular offset resulted from angle deviation. Generally, the present invention can quickly determine the defect on the smartphone (9) with fixed inspection standards to truly evaluate the value of the smartphone (9). As such, the owner of the smartphone (9) can clearly understand the whole situation of the smartphone (9) and recycles the smartphone (9) to gain the appropriate remuneration.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A smartphone inspection device, comprising:

a main body extending along a height direction, wherein the main body comprises: a first inclined surface formed at an end of the main body; and an inspection space formed inside the main body and communicated with the first inclined surface, wherein the inspection space comprises: a second inclined surface formed adjacent to the first inclined surface for optionally being in contact with a first surface of a smartphone; and a third inclined surface formed corresponding to the first inclined surface and formed adjacent to the second inclined surface for optionally being in contact with a second surface of the smartphone;

a lid deposited on the first inclined surface for optionally shielding the inspection space;

a push bar movably deposited inside the main body and deposited corresponding to the second inclined surface for optionally pushing the smartphone from a first position to a second position, wherein when the smartphone is at the first position, the first surface of the smartphone is in contact with the second inclined surface; when the smartphone is at the second position, the second surface of the smartphone is in contact with the third inclined surface; and a camera assembly deposited in the inspection space and deposited corresponding to the lid for optionally taking an image of the first surface of the smartphone and another image of the second surface of the smartphone upon the lid shielding the inspection space;

wherein the inspection space comprises: a fourth inclined surface formed adjacent to the first inclined surface and the third inclined surface and formed corresponding to the second inclined surface; and the camera assembly comprises: a first camera deposited at a side of the fourth inclined surface facing the inspection space for optionally taking the image of the second surface of the smartphone upon the smartphone placed on the second inclined surface; and a second camera deposited on a side of the lid facing the inspection space for optionally taking the image of the first surface of the smartphone upon the smartphone placed on the third inclined surface;

wherein the first inclined surface is formed parallel with the third inclined surface, and the second inclined surface is formed parallel with the fourth inclined surface.

2. The smartphone inspection device as claimed in claim 1, further comprising:

a lighting device deposited in the inspection space for optionally illuminating the smartphone.

3. The smartphone inspection device as claimed in claim 1, further comprising:

an arc portion rotatably deposited at a boundary between the second inclined surface and the third inclined surface so that an end of the smartphone is optionally placed in the arc portion; wherein when the push bar pushes the smartphone, the smartphone is rotated to push the arc portion so that the arc portion is rotated at the boundary between the second inclined surface and the third inclined surface.

4. The smartphone inspection device as claimed in claim 3, further comprising:

a modem connector deposited on the arc portion for optionally being connected to the smartphone and for optionally driving the smartphone to execute at least one application and to record a body data of the smartphone and a body load of the smartphone upon the application executed, wherein the body data comprises: a product model of the smartphone, a brand of the smartphone, a manufactured date of the smartphone, or a warranty date of the smartphone, and the body load comprises: a power consumption of the smartphone, a body temperature of the smartphone, a processing efficiency of the smartphone, a speaker volume of the smartphone, a speaker noise of the smartphone, or a button response of the smartphone; and a processor deposited inside the main body and to be connected to the modem connector and the camera assembly for optionally: receiving the body data to convert into a depreciation factor; receiving the body load to be compared with a standard value and then to obtain a first efficacy index based on difference according to the comparison; receiving the images to mark a defect portion of the smartphone on the images and then to obtain a second efficacy index based on evaluating an damage extent of the marked defect portion on the images; performing a weighted calculation on the depreciation factor, the first efficacy index, and the second efficacy index to obtain an appraisal index; and multiplying the appraisal index and an original purchase price of the smartphone to obtain a recycle price of the smartphone.

5. The smartphone inspection device as claimed in claim 4, further comprising:

a display panel deposited on the first inclined surface for optionally showing the depreciation factor, the first efficacy index, the second efficacy index, and the recycle price.

6. The smartphone inspection device as claimed in claim 1, further comprising:

a cushion pad deposited on a side of the second inclined surface facing the inspection space or deposited on a side of the third inclined surface facing the inspection space.

7. The smartphone inspection device as claimed in claim 1, further comprising:

a storage space arranged with spacing between the inspection space inside the main body and communicated with the inspection space for optionally receiving the smartphone;

a cushion blocking plate deposited in the storage space for optionally reducing vertical percussion force on the smartphone upon the smartphone falling; and a cushion patch deposited at a side of the storage space facing the main body for optionally reducing horizontal percussion force on the smartphone upon the smartphone falling.

8. The smartphone inspection device as claimed in claim 7, further comprising:

an aperture formed at a boundary between the second inclined surface and the third inclined surface and communicated with the storage space and the inspection space; and a door sheet movably deposited on the second inclined surface for opening or closing the aperture to allow sliding of the smartphone from the inspection space into the storage space.

* * * * *